United States Patent
Hong et al.

(10) Patent No.: US 7,784,352 B2
(45) Date of Patent: Aug. 31, 2010

(54) APPARATUS FOR MEASURING PRESSURE BY USING DIAPHRAGM AND METHOD OF PRESSURE MEASUREMENT BY USING DIAPHRAGM

(75) Inventors: Seung Soo Hong, Daejeon (KR); Yong Hyeon Shin, Daejeon (KR); Jin Tae Kim, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 75 days.

(21) Appl. No.: 12/345,054

(22) Filed: Dec. 29, 2008

(65) Prior Publication Data
US 2009/0260448 A1    Oct. 22, 2009

(30) Foreign Application Priority Data
Apr. 18, 2008    (KR) ............... 10-2008-0036396

(51) Int. Cl.
*G01L 9/12*    (2006.01)

(52) U.S. Cl. .......................................... 73/718; 73/724
(58) Field of Classification Search .................. None
See application file for complete search history.

(56) References Cited

U.S. PATENT DOCUMENTS

| 4,578,735 | A * | 3/1986 | Knecht et al. ............. 361/283.4 |
| 2007/0113663 | A1 * | 5/2007 | Crockett et al. ............... 73/718 |
| 2007/0227907 | A1 * | 10/2007 | Shah et al. ............... 205/777.5 |
| 2010/0096278 | A1 * | 4/2010 | Shah et al. ............... 205/777.5 |

* cited by examiner

*Primary Examiner*—Andre J Allen
(74) *Attorney, Agent, or Firm*—The Webb Law Firm

(57) ABSTRACT

The present invention relates to a capacitance type pressure measurement apparatus by using a diaphragm, and more specifically to an apparatus for measuring pressure by using a diaphragm capable of measuring pressure of atmospheric pressure or less as well as pressure of atmospheric pressure or more without having a getter pump by fixedly mounting a pressure variable container on a sensor housing having a diaphragm mounted therein.

5 Claims, 5 Drawing Sheets

US 7,784,352 B2

APPARATUS FOR MEASURING PRESSURE BY USING DIAPHRAGM AND METHOD OF PRESSURE MEASUREMENT BY USING DIAPHRAGM

TECHNICAL FIELD

The present invention relates to a capacitance type pressure measurement apparatus by using a diaphragm, and more specifically to an apparatus for measuring pressure by using a diaphragm capable of measuring pressure of atmospheric pressure or less as well as pressure of atmospheric pressure or more without having a getter pump by fixedly mounting a pressure variable container on a sensor housing having a diaphragm.

Also, the present invention relates a method of pressure measurement by using the aforementioned pressure measurement apparatus.

BACKGROUND ART

FIG. 1 shows a configuration diagram of a capacitance type pressure measurement apparatus by using a conventional diaphragm.

Referring to FIG. 1, the conventional technology has a sensor housing 12. The sensor housing 12 is formed with a first open tube 12-1 and a second open tube 12-2.

Referring to FIG. 1, the sensor housing 12 is formed with an electrode substrate 14, the electrode substrate 14 being attached with an electrode 14T. The electrode substrate 14 is formed with a through hole (not shown) to mutually communicate the first open tube 12-1 and the second open tube 12-2. Also, a diaphragm 16 is fixedly mounted between the electrode substrate 14 and the first open tube 12-1 to spatially isolate the electrode substrate 14 and the first open tube 12-1. An outer circumference surface of the diaphragm 16 is fixedly mounted on an inner side wall of the sensor housing 12. The diaphragm 16 is a conductor of an elastic material.

Referring to FIG. 1, the second open tube 12-2 is mounted with a getter pump 18 to make a space between the diaphragm 16 and the second open tube into a vacuum state. The getter pump 18 may actually be a gas remover, such as zirconium (Zr), thallium (Ti), etc., dropping pressure by adsorbing and removing gas through chemical reaction rather than a pump.

In the conventional technology, when the first open tube 12-1 is positioned in a measurement object region higher than vacuum pressure, the diaphragm 16 is convexedly bent toward the electrode 14T so that capacitance between the electrode 14T and the diaphragm 16 is changed. The conventional technology measures pressure in a measurement object region, in which the first open tube 12-1 is positioned, through the change in capacitance.

However, when the gas remover configuring the getter pump 18 is consumed, the conventional technology causes the inconvenience of replacing it.

Also, when the pressure in the measurement object region is normal pressure much higher than vacuum pressure being pressure at a place where the getter pump 12-2 is positioned, the conventional technology has a difficulty in measuring the pressure in the measurement object region due to a limitation associated with elastic deformation.

DISCLOSURE OF THE INVENTION

It is an object of the present invention to provide an apparatus for measuring pressure by using a diaphragm capable of easily measuring vacuum pressure and pressure in normal pressure higher than atmospheric pressure without having a getter pump.

There is provided an apparatus for measuring pressure by using a diaphragm according to the present invention, comprising: a diaphragm sensor including a sensor housing formed with a first opening and a second opening, a diaphragm mounted between the first opening and the second opening and provided with a conducive part to spatially isolate the first opening and the second opening from each other, an electrode substrate formed with a through hole to form a channel between the second opening and a diaphragm and mounted between the second opening and the diaphragm, and an electrode attached to the electrode substrate to face the diaphragm; and a pressure variable container formed with a third opening and a fourth opening and fixed with the sensor housing to communicate the second opening with the third opening.

The present invention may comprise: a gate valve opening and closing the fourth opening; a gas inlet pipe provided with a gas flux control valve for controlling gas amount flowed in the pressure variable container and connected to the pressure variable container; and a container pressure measuring gauge for measuring pressure inside the pressure variable container upon closing the pressure variable container by the gate valve, the diaphragm being mounted to be spaced by a predetermined distance from the first opening so that it can convexedly be bent toward the first opening without contacting the first opening.

In the present invention, the sensor housing is formed with a flange part to be closely fixed to the pressure variable container.

There is provided a method of pressure measurement by using an apparatus for measuring pressure comprising the steps of: closing a fourth opening by an operation of a gate valve; flowing gas in a pressure variable container through a gas inlet pipe; controlling pressure inside the pressure variable container to be constant pressure by using a gas flux control valve; and, positioning a first opening in a pressure measurement space higher than pressure inside the pressure variable container controlled in the pressure control step.

The apparatus for measuring pressure by using the diaphragm according to the present invention has an effect capable of measuring vacuum pressure and higher pressure than atmospheric pressure

DETAILED DESCRIPTION OF MAIN ELEMENTS

Figure 1:
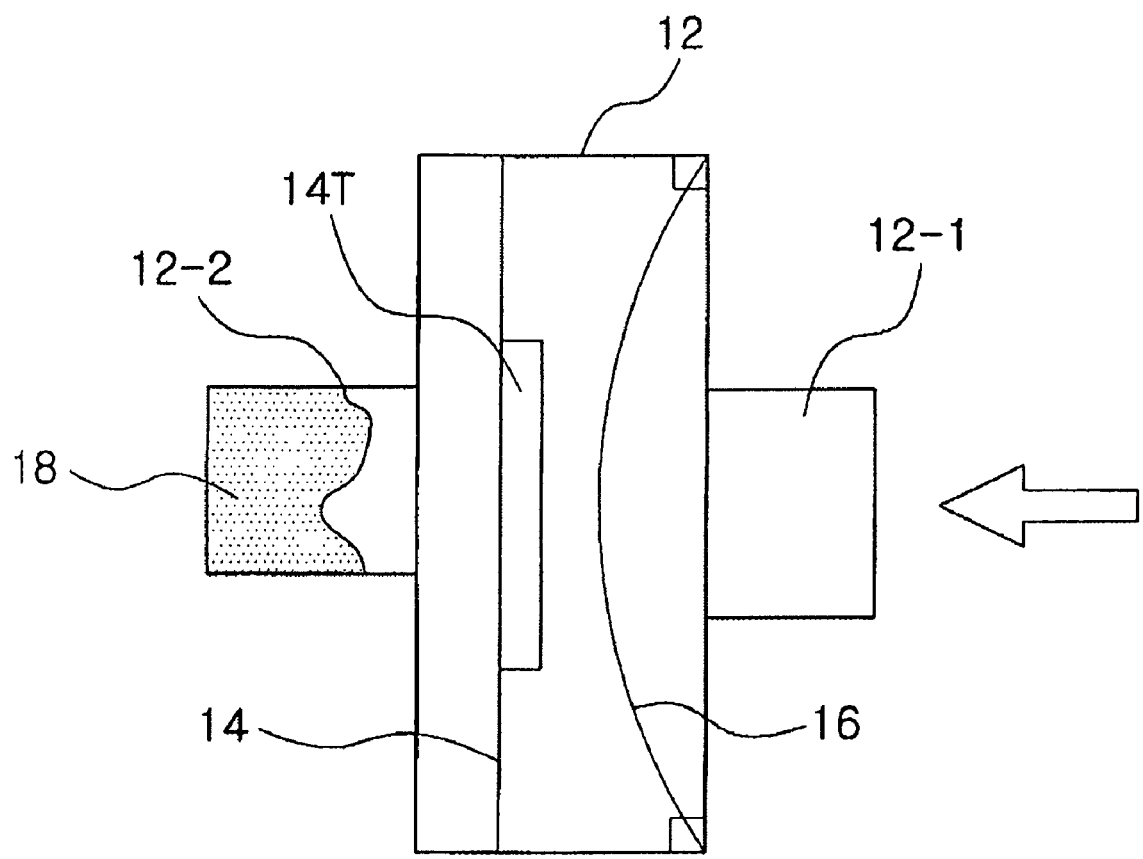
FIG. 1 is a configuration diagram of a capacitance type pressure measurement apparatus by using a conventional diaphragm.

110: diaphragm sensor 112: sensor housing
112-1: first open tube 112-2: second open tube
112F: flange part
114: electrode substrate 114T: electrode
114L: electrode line 114H: through hole 116: diaphragm 118: signal processor
122: pressure variable container
122-4: fourth open tube
122-4V: gate valve 122-5: gas inlet pipe
122-5V: gas flux control valve
130: gas tank
140: container pressure measurement gauge

BEST MODE FOR CARRYING OUT THE
INVENTION

Hereinafter, one embodiment of the present invention will be described with the accompanying drawings.

Embodiment 1

Figure 2:
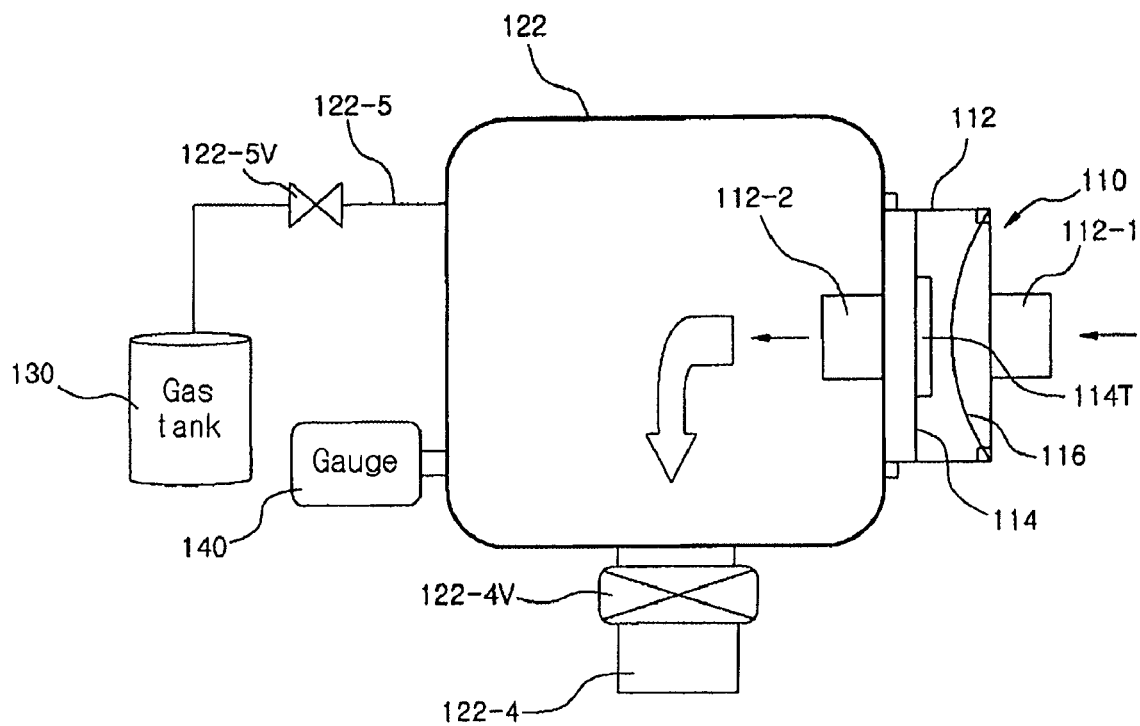
FIG. 2 is a schematic configuration diagram of an embodiment 1.

An embodiment 1 relates to an apparatus for measuring pressure using a diaphragm according to the present invention. FIG. 2 is a schematic configuration diagram of an embodiment 1, FIG. 3 is a detailed diagram of a diaphragm sensor of FIG. 1, and FIG. 4 is a detailed diaphragm of an electrode substrate.

Referring to FIG. 2, the embodiment 1 has a diaphragm sensor 110 and a pressure variable container 122.

Figure 3:
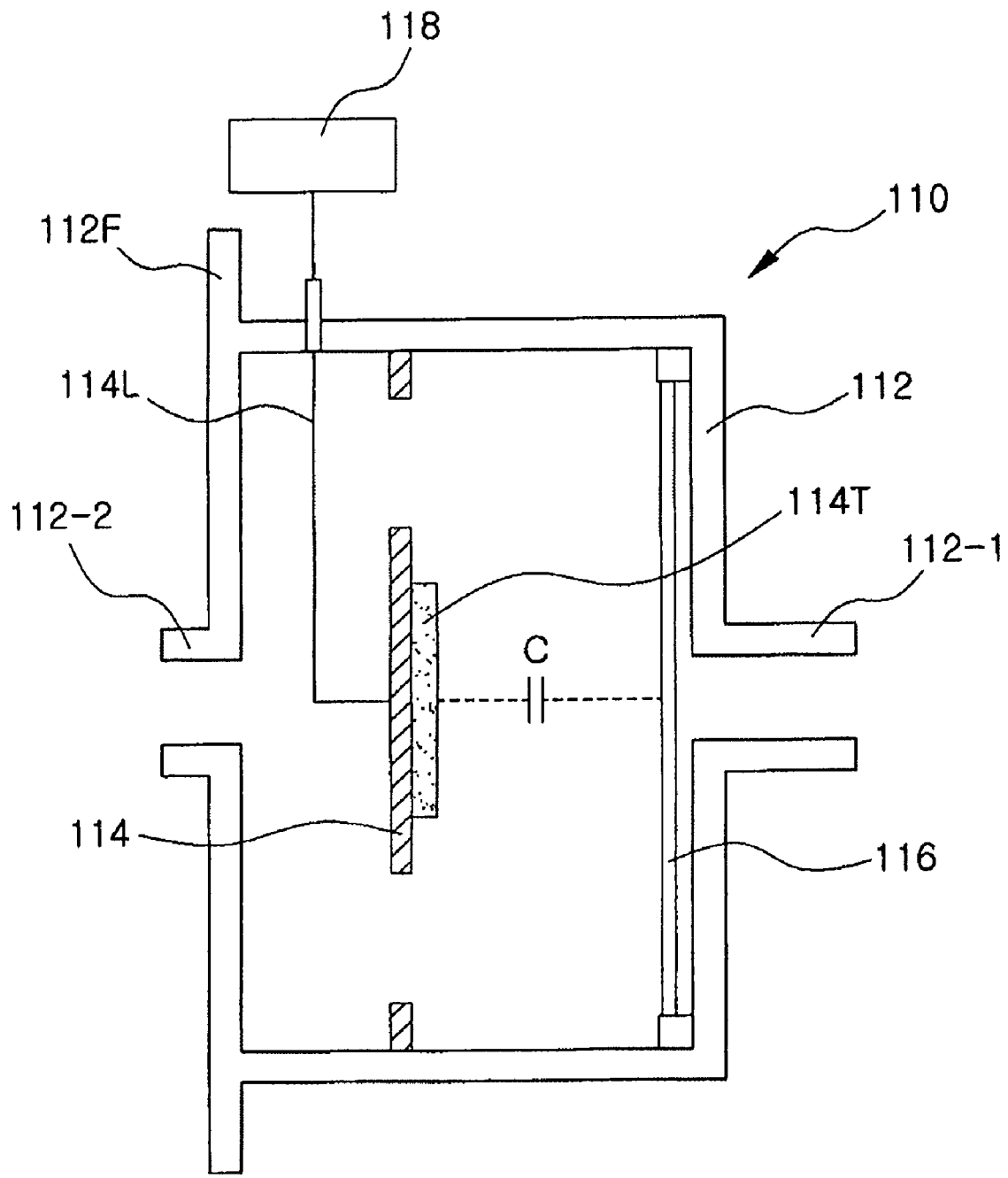
FIG. 3 is a detailed diagram of a diaphragm sensor of FIG. 1.
Figure 4:
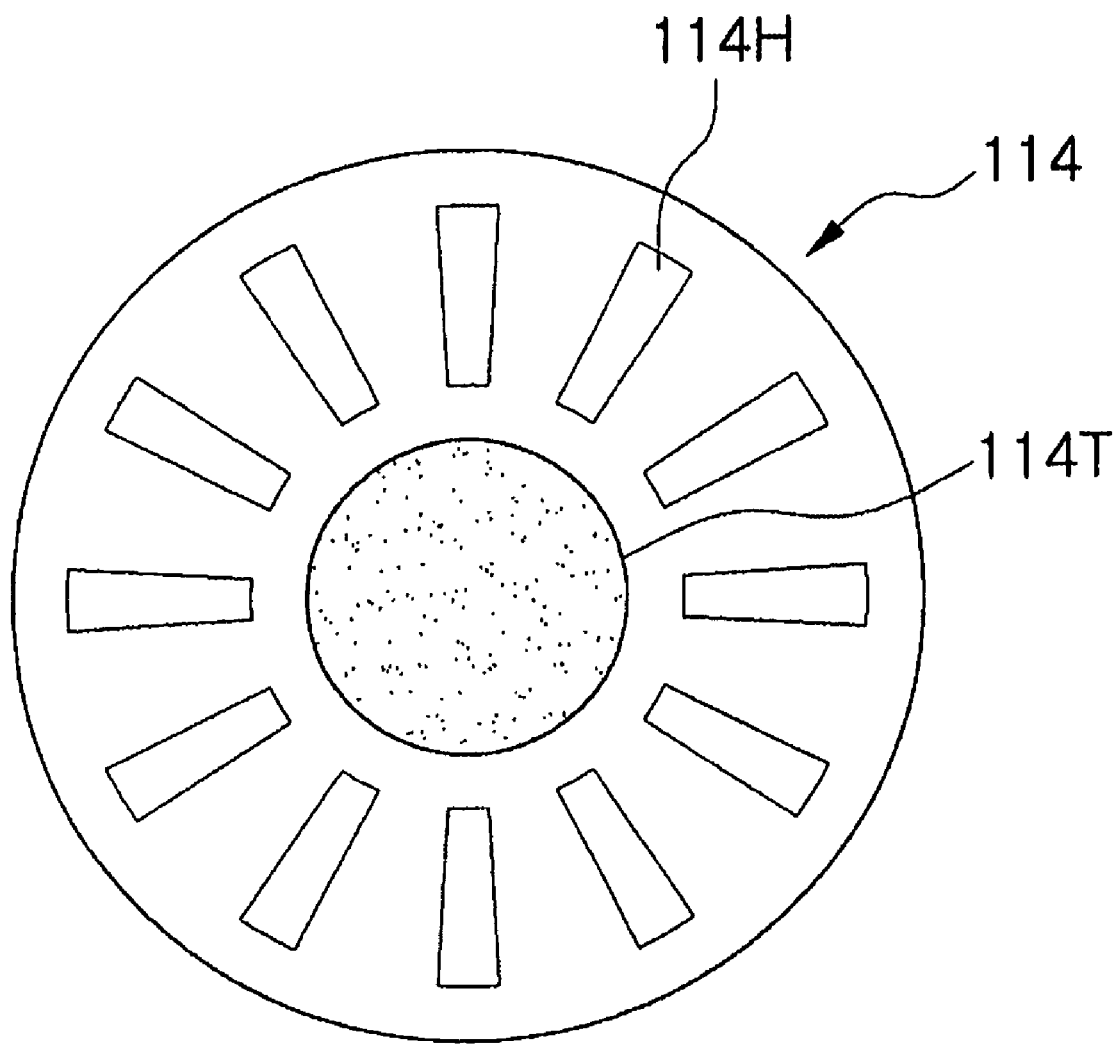
FIG. 4 is a detailed diagram of an electrode substrate of FIG. 3.

Referring to FIGS. 2 and 3, the diaphragm sensor 110 includes a sensor housing 112, an electrode substrate 114, an electrode 114T, an electrode line 114L, a diaphragm 116, and a signal processor 118.

Referring to FIGS. 2 and 3, the sensor housing 112 is formed with a first open tube 112-1 communicating with a first opening (no reference numeral) and a second open tube (112-2) communicating with a second opening (no reference numeral).

Referring to FIG. 3, the diaphragm 116 is mounted between the first opening (no reference numeral) and the second opening (no reference numeral), wherein the circumference of the diaphragm 116 is fixedly mounted on an inner side of the sensor housing 112 to spatially isolate the first opening (no reference numeral) and the second opening (no reference numeral) from each other. The diaphragm 116 can contact a side wall formed with the first opening (no reference numeral) to be elastically deformed only toward the second opening (no reference numeral. At this time, the circumference of the diaphragm 116 can fixedly be mounted on the inner side of the sensor housing 112 by welding. Meanwhile, in the case of the present invention, the diaphragm 116 is provided with a conductor, wherein in the case of the embodiment 1, the diaphragm 116 itself is formed of a metal thin plate of an elastic material.

Referring to FIG. 3, the electrode substrate 114 is mounted between the second opening (no reference numeral) and the diaphragm 116. Referring to FIG. 3 together with FIG. 4, the electrode substrate 114 is provided with a plurality of through holes 114H penetrating through the left and right thereof. The through hole 114H is to mutually communicate a space between the second opening (no reference numeral) and the electrode substrate 114 and a space between the electrode substrate 114 and the diaphragm 116.

Referring to FIGS. 3 and 4, the electrode substrate 114 is attached with an electrode 114T. The electrode 114T is attached to a central part of the electrode substrate 114, wherein it is attached to a surface facing the diaphragm 116 among the electrode substrate 114. The electrode substrate 114 is formed of an isolative material.

Referring to FIG. 3, the electrode 114T is connected to an electrode line 114L. The electrode line 114L is connected to a signal processor 118. The signal processor 118 is an apparatus to display pressure according to a signal input from the electrode line 114L.

Referring to FIG. 2, the pressure variable container 122 is formed with a third opening (no reference numeral) in which the second open tube 112-2 of the sensor housing 112 is fitted. In other words, the second open tube 112-2 of the sensor housing 112 is fitted in the third opening (no reference numeral), so that a left space of the diaphragm 116 is communicated with the pressure variable container 122. Meanwhile, in order to seal between the pressure variable container 122 and the second open tube 112-2, a sealing material, such as silicon, etc, may be attached between the outer circumference surface of the second open tube 112-2 and the third opening (no reference numeral). Also, the sensor housing 112 may be formed with a flange part (112F. see FIG. 3) to help the sealing between the pressure variable container 122 and the second open tube 112-2 as well as to attach the sensor housing 112 to the pressure variable container 122.

Referring to FIG. 2, the pressure variable container 122 is formed with a fourth open tube 122-4 communicating with a fourth opening (no reference numeral). The fourth open tube 122-4 is provided with a gate valve 122-4V opening and closing the fourth opening (no reference numeral).

Referring to FIG. 2, the pressure variable container 122 is connected to a gas inlet pipe (122-5). The gas inlet pipe 122-5 is an inlet pipe for flowing gas in the pressure variable container 122. The gas inlet pipe 122-5 is provided with a gas flux control valve 122-5V for controlling gas amount flowed in the pressure variable container 122. Meanwhile, the gas inlet pipe 122-5 is connected to a gas tank 130.

Referring to FIG. 2, the pressure variable container 122 is mounted with a container pressure measurement gauge 140. The pressure inside the pressure variable container 122 can be measured by using the container pressure measurement gauge 140 when the pressure variable container 122 is closed by the gate valve 122-4V.

Hereinafter, an operation of the aforementioned one embodiment will be described.

Referring to FIG. 3, the electrode 114T has capacitance C between it and the diaphragm 116. The capacitance C varies according to a distance between the electrode 114T and the diaphragm 116. The capacitance C according to the distance between the electrode 114T and the diaphragm 116 depends on the following equation 1.

$$C = \in A/D \qquad \text{[Equation 1]}$$

Where C is capacitance between the electrode 114T and the diaphragm 116, $\in$ is dielectric constant, A is an area of an electrode, and D is a distance between the electrode 114T and the diaphragm 116.

Since the diaphragm 116 is an elastic material, if pressure in a region in which the first open tube 112-1 is positioned is larger than pressure inside the pressure variable container 122, the diaphragm is bent toward the electrode substrate 114. FIG. 1 shows this state. Meanwhile, the change in capacitance C according to the distance between the electrode 114T and the diaphragm 116 and the pressure in the measurement object region can be measured through the signal processor 118 connected to the electrode line 114L.

(1) Case Where the Pressure in the Measurement Object Region is Atmospheric Pressure or Less The first open tube 112-1 is positioned under the atmospheric pressure region and the fourth open tube 122-4 is positioned in the measurement object region by opening the gate valve 122-4V. At this time, if pressure in the region in which the first open tube 112-1 is positioned is $P_1$ and the pressure in the measurement object pressure is $P_4$, it is $P_1 > P_4$, so that the diaphragm is convexedly bent toward the electrode substrate 114. Thereby, the capacitance C between the electrode 114T and the diaphragm 116 is changed so that the pressure $P_4$ can be measured through the signal processor 118.

(2) Case Where the Pressure in the Measurement Object Region is Atmospheric Pressure or More The first open tube 112-1 is positioned under the measurement object region and the gate valve 122-4V is closed. Then, gas is injected into the pressure variable container 122 via the gas inlet tube 122-5. Thereafter, when it is confirmed through the container pressure measurement gauge 140 that the pressure in the pressure variable container 122 reaches an atmospheric pressure state, the gas flux control valve 122-5 is closed. If the pressure in the pressure variable container 122 exceeds atmospheric pressure, the gate valve 122-4V is opened to allow the pressure in the pressure variable container 122 to reach atmospheric pressure. At this time, if the pressure in the measurement object region is $P_1$ and the pressure in the pressure variable container 122 is $P_4$, it is $P_1 > P_4$, so that the diaphragm 116 is convexedly bent toward the electrode substrate 114. Thereby, the capacitance C between the electrode 114T and the diaphragm 116 is changed so that the pressure $P_1$ can be measured through the signal processor 118.

The embodiment 1 positions the first open tube 112-1 of the sensor housing 112 under atmospheric pressure and positions the fourth open tube 122-4 of the pressure variable container 122 in the pressure measurement object region, making it possible to measure lower pressure than atmospheric pressure. On the other hand, the first open tube 112-1 of the sensor housing 112 is positioned in the pressure measurement object region in a state where the internal pressure of the pressure variable container 122 maintains at atmospheric pressure, making it possible to measure higher pressure than atmospheric pressure.

Meanwhile, the embodiment 1 is not limited thereto. The embodiment 1 may mount the diaphragm 116 to be spaced by a predetermined distance from the first opening (no reference numeral) of the sensor housing 112 so that the diaphragm 116 can convexedly be bent toward the first opening (no reference numeral) of the sensor housing 112. In this case, the first open tube 112-1 of the sensor housing 112 is positioned under atmospheric pressure and the fourth open tube 122-4 of the pressure variable container 122 is positioned in the pressure measurement object region, making it possible to measure higher pressure than atmospheric pressure. The gas inlet pipe 122-5 and the container pressure measurement gauge 140 may not be provided.

Embodiment 2

Figure 5:
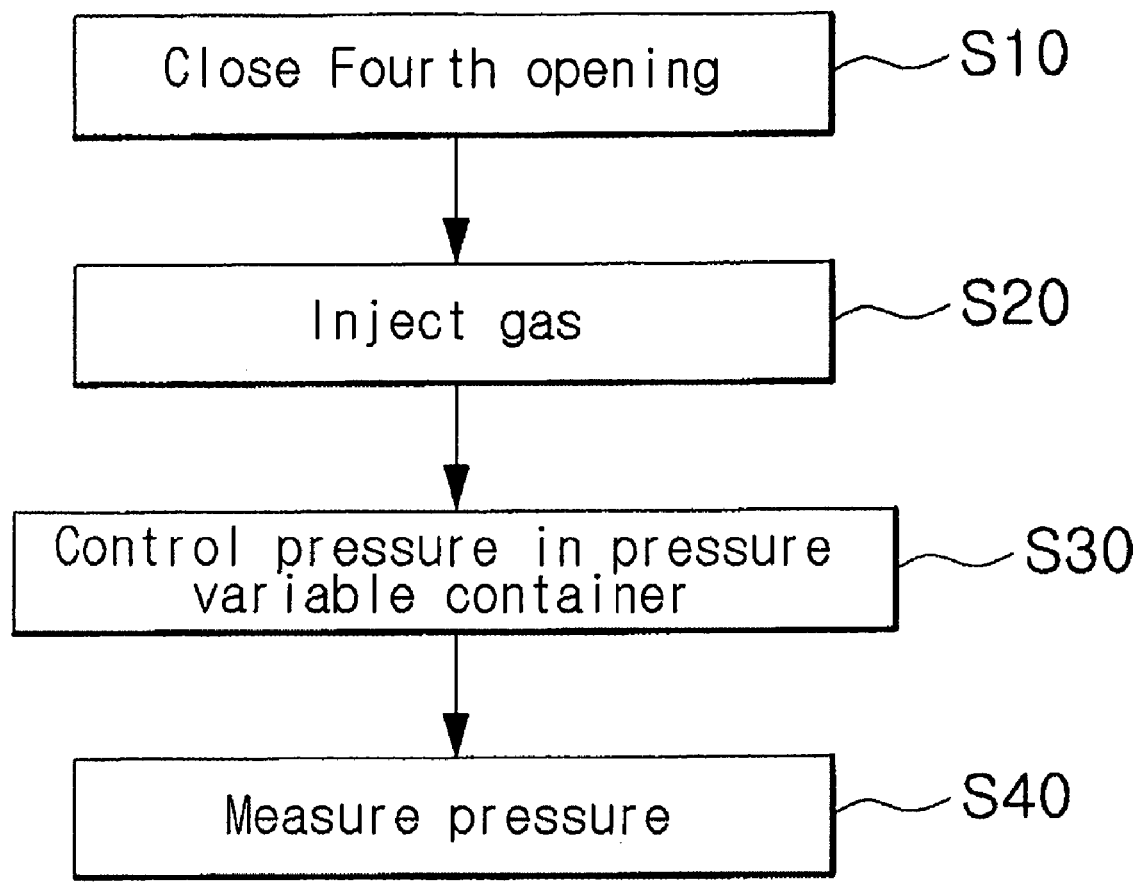
FIG. 5 is a flow chart of an embodiment 2.

An embodiment 2 relates to a method of pressure measurement by using the embodiment 1. FIG. 5 shows a flow chart of the embodiment 2.

Referring to FIG. 5, the embodiment 2 has a step S10 of closing the fourth opening, a step S20 of injecting gas, a step S30 of controlling pressure in the pressure variable container, and a step S40 of measuring pressure.

Referring to FIG. 2, in the step S10 of closing the fourth opening, the gate valve 122-4V is operated to close the fourth opening (not shown).

Referring to FIG. 2, in the step S20 of injecting gas, gas is injected into the pressure variable container 122 via the gas inlet pipe 122-5. In the step S20 of injecting gas, the gas flux control valve 122-5V is opened.

Referring to FIG. 2, in the step S30 of controlling pressure in the pressure variable container, the pressure inside the pressure variable container 122 is maintained at constant pressure, that is, atmospheric pressure. If the pressure inside the pressure variable container 122 reaches preset constant pressure, that is, atmospheric pressure, the gas flux control valve 122-5V is closed.

Referring to FIGS. 2 and 3, in the step 540 of measuring pressure, the first open tube 112-1 is positioned in the pressure measurement space to measure the pressure $P_1$ in the pressure measurement region through the signal processor 118. At this time, the pressure $P_1$ in the pressure measurement region is higher than the pressure $P_4$ inside the pressure variable container 122 controlled in the step S30 of controlling the pressure in the pressure variable container.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. An apparatus for measuring pressure by using a diaphragm comprising:
   a diaphragm sensor including a sensor housing formed with a first opening and a second opening, a diaphragm mounted between the first opening and the second opening to spatially isolate the first opening and the second opening from each other and provided with a conducive part, an electrode substrate formed with a through hole to form a channel between the second opening and the diaphragm and mounted between the second opening and the diaphragm, and an electrode attached to the electrode substrate to face the diaphragm; and
   a pressure variable container formed with a third opening and a fourth opening and on which the sensor housing is fixed to communicate the second opening with the third opening.

2. The apparatus according to claim 1, further comprising:
   a gate valve opening and closing the fourth opening;
   a gas inlet pipe provided with a gas flux control valve for controlling gas amount flowed in the pressure variable container and connected to the pressure variable container; and
   a container pressure measuring gauge for measuring pressure inside the pressure variable container when the pressure variable container is closed by the gate valve.

3. The apparatus according to claim 1, wherein the diaphragm is mounted to be spaced by a predetermined distance from the first opening so that it can convexedly be bent toward the first opening without contacting the first opening.

4. The apparatus according to any one of claims 1 to 3, wherein the sensor housing is formed with a flange part to be closely fixed to the pressure variable container.

5. A method of pressure measurement by using the apparatus for measuring pressure as claimed in claim 2 comprising the steps of:
   closing the fourth opening by an operation of the gate valve;
   flowing gas in the pressure variable container through the gas inlet pipe;
   controlling pressure inside the pressure variable container to be constant pressure by using the gas flux control valve; and,
   positioning the first opening in a pressure measurement space higher than pressure inside the pressure variable container controlled in the pressure control step.

* * * * *